M. G. NIXON & O. SMITH.
FILING CASE FOR DISK RECORDS.
APPLICATION FILED JULY 22, 1916.

1,274,191.

Patented July 30, 1918.
2 SHEETS—SHEET 1.

WITNESSES:
John E. Baumgarten
Ansley Flowers

INVENTORS
Miles G. Nixon
Oberlin Smith

M. G. NIXON & O. SMITH.
FILING CASE FOR DISK RECORDS.
APPLICATION FILED JULY 22, 1916.
1,274,191.
Patented July 30, 1918.
2 SHEETS—SHEET 2.
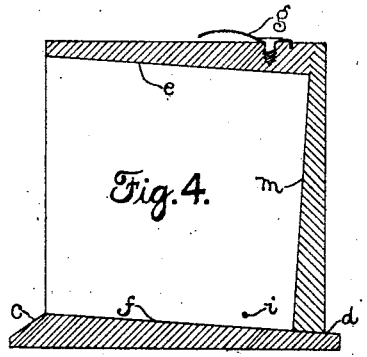
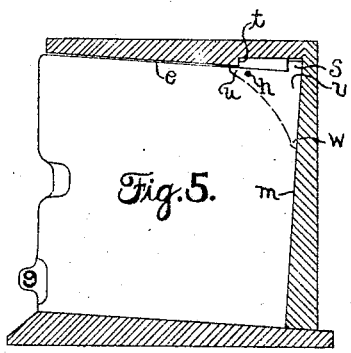
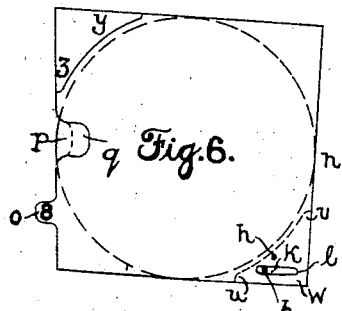
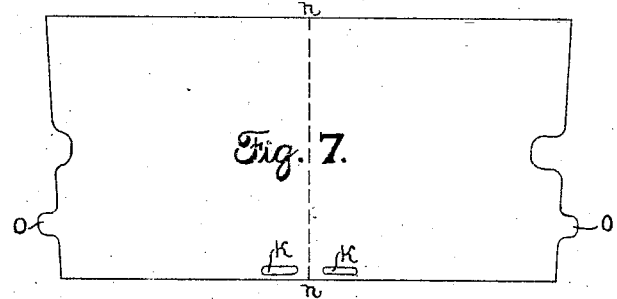
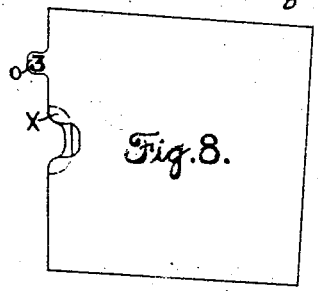
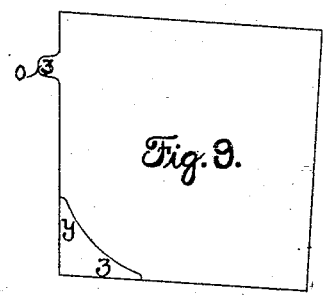
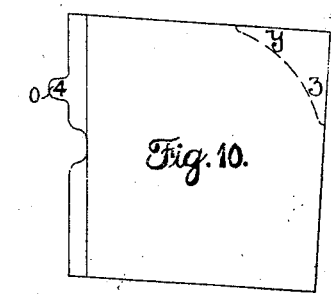
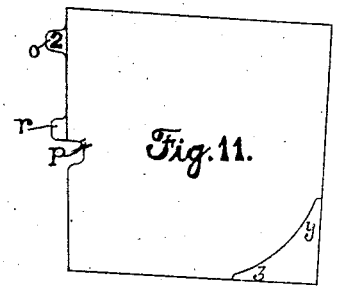
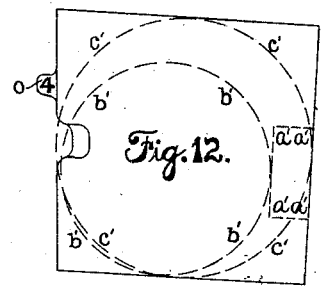
WITNESSES:
John E. Baumgarten
Ansley Flowers
INVENTORS
Miles G. Nixon
Oberlin Smith

UNITED STATES PATENT OFFICE.

MILES G. NIXON, OF CHICAGO, ILLINOIS, AND OBERLIN SMITH, OF BRIDGETON, NEW JERSEY.

FILING-CASE FOR DISK RECORDS.

1,274,191.  Specification of Letters Patent.  Patented July 30, 1918.

Application filed July 22, 1916. Serial No. 110,730.

*To all whom it may concern:*

Be it known that we, MILES G. NIXON and OBERLIN SMITH, citizens of the United States, said NIXON residing at Chicago, county of Cook, State of Illinois, and said SMITH residing at Bridgeton, in the county of Cumberland and State of New Jersey, have invented certain new and useful Improvements in Filing-Cases for Disk Records, of which the following is a specification.

The object of our invention is to produce a low-priced compact record-holder, that will reduce the time required for the selection, removal and return of a record to a minimum, and facilitate the removal of a worn or broken part and the substitution of a new one.

The following description and the accompanying drawings make our invention sufficiently clear for one skilled in the art to produce it.

The same letter is used to designate the same part in the various figures.

Figure 1 is an isometric perspective of a record holder embodying our invention with all of the records in place;

Fig. 4 is a vertical, longitudinal section of the box or case;

Fig. 5 is a similar view with a record-container in position, and the construction being somewhat different from that shown in other figures;

Fig. 6 is a side elevation of a record-container with a record therein;

Fig. 7 is a side view of a record-container before it is folded into its complete form;

Figs. 8 to 11 are side views, respectively, of different forms of containers;

Fig. 12 is a similar view showing the adaptation of a container to records of different sizes.

Figure 1:
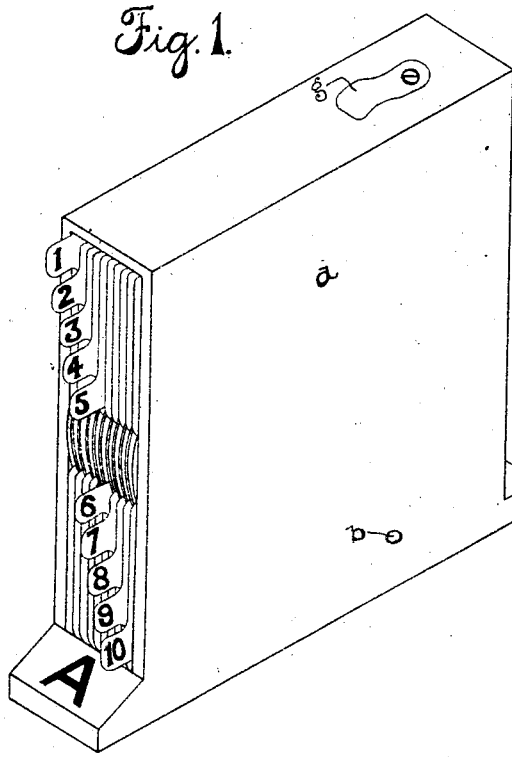

Fig. 1 shows an isometric perspective of the record-holder complete. $a$ is a light box or case open at the front. It contains several folders or record containers; these are sheets of cardboard or other flexible material, folded on themselves, at the back; they are provided with ears or tabs, recesses or notches and with various reinforcements, all of which together with other details are hereinafter described. The said folders are free to be drawn forward for a portion of their length, and are prevented from being drawn out more than a fixed amount by a pin, shown at $b$, and slot arrangement which is also hereinafter fully described.

Fig. 6 shows one of the folders removed from the box, containing a record. Fig. 7 shows the same but is not folded.

Figure 2:
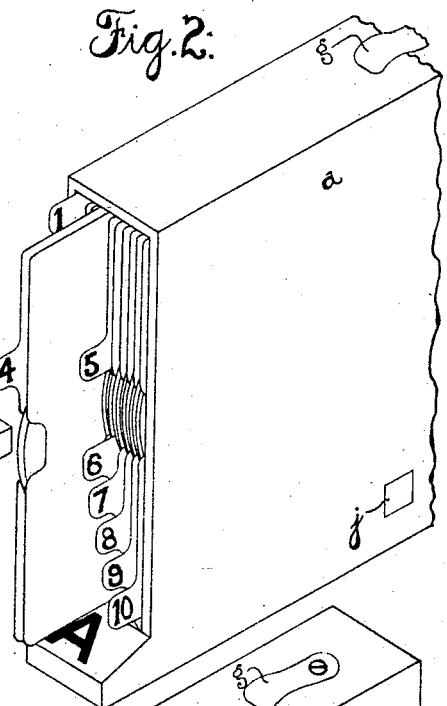
Fig. 2 is a similar view thereof showing a record container withdrawn preliminary to the removal of the record therefrom.
Figure 3:
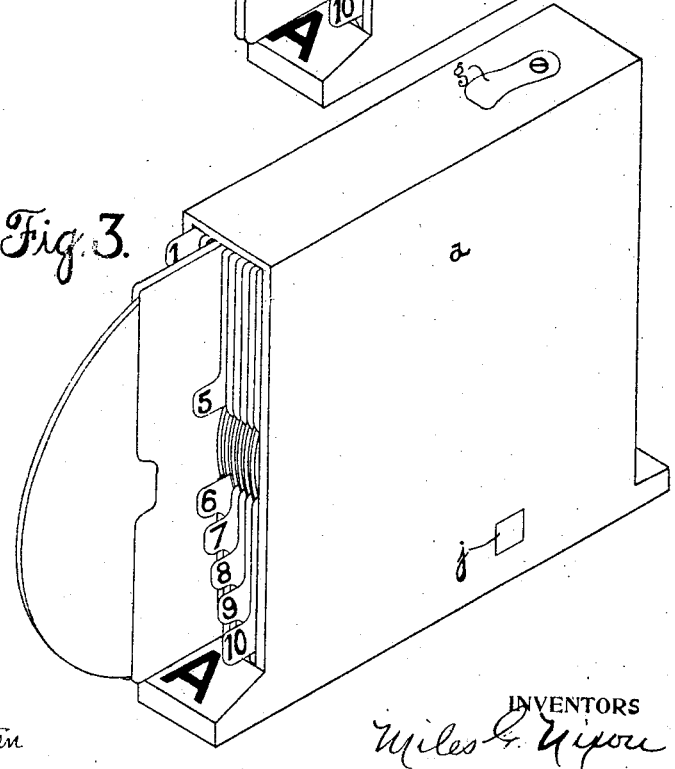
Fig. 3 is a like view showing the record partially removed from the container.

Figs. 2 and 3 are the same view as Fig. 1 but in Fig. 2 a folder is shown pulled out to its limit, and Fig. 3 is as Fig. 2 but with a record partly withdrawn from a folder.

Fig. 4 is a longitudinal sectional view of the box or case, the top, bottom and back shown hatched. These may preferably be constructed of wood.

The contained part of the bottom piece inclines to the back. This is with the object of preventing the records, the lower point of which rest thereon, from rolling out by gravity and falling, should the case happen to be placed on a shelf with a forward pitch.

The projection $c$ is for the reception of a symbol designating the individual filing-case.

The projection $d$ is a gage piece that prevents the case from being pushed unnecessarily far back on a shelf unnecessarily deep.

The under surface of the top piece $e$ is parallel with the upper surface of the bottom piece $f$. This is with the object of guiding the folder vertically when slid in or out, the top and bottom edges of said folder being parallel and its height being only enough less than the distance from $e$ to $f$ to enable it to move freely.

At $g$, is shown a brake-spring intended to anchor, by pressure and the resulting friction, the case between two shelves that are distanced only a little more than the height of the case. Were it not for such spring the frictional resistance encountered, in pulling a folder forward might cause the whole case to slide forward.

The hole $i$ piercing the side piece is for the reception of one end of a pin or rod $b$, the other end being received by a corresponding hole in the opposite sidepiece. The rod may be restrained from moving endwise by bits of tough paper or court plaster $j$, Fig. 3, pasted over the holes, or by other methods.

The pin $b$, Fig. 1 and Fig. 6, is threaded through the slots $k$ in the record container, Figs. 6 and 7, preferably it has a diameter slightly less than the width of said slots, so that no friction is produced by them. When the folder is drawn forward the rear of the slot $l$ comes in contact with the pin and is restrained from further motion. The outer end of the slot, might be given such a length as to similarly restrain the inward motion but we prefer to make the slot slightly longer than this provision would call for, and stop the inward motion by having the back of the folder come in contact with the forward surface of the back piece $m$, Figs. 4 and 5.

Referring again to Figs. 6 and 7, the sheet is folded on itself at the back $n$.

The ear or tab $o$, shown in all the figures excepting 4, has the double object of furnishing an area for a label or symbol designating the special record contained therein, and also furnishing a means of seizing and drawing the folder forward, as shown in Figs. 2 and 3. This ear or tab is provided on both leaves of the folder. The principle is entirely operative with this ear or tab only provided on one leaf $o$, Fig. 9, but a thinner and more fragile cardboard may be utilized with an ear on both leaves and, therefore, we prefer it. In Figs. 10 and 12 the folders are provided with an ear on only one of the leaves.

As shown, there are several folders in a case, an ear or tab being about its own height lower than that of its left hand neighbor. This is not only with the object of providing such distance between neighboring ears at the same height, in the same case or an adjacent case, that the symbol is not unduly foreshortened and hence rendered illegible, but also to give room for an operator's finger on one side and thumb on the other for drawing it forward.

Having drawn a folder out to the limit of its travel, the record is withdrawn by finger and thumb, seizing it where exposed by the notches cut, preferably near the middle in both leaves of the folder as seen at $p$, Fig. 6 containing a record and Fig. 12, empty.

Having extracted a record, its folder is left protruding so as, when returning it, to show at a glance where it belongs.

The two leaves of an empty folder will, of course, only be about the thickness of a record apart, and this is too close to enable the record to be replaced promptly. It is, therefore, expedient to spread their forward edges apart, producing a flaring opening.

This is performed preferably by giving a greater depth to the notch in one leaf than in the other. A finger or thumb may then be pressed laterally upon the area $q$, Fig. 6, thus exposed on the leaf with the more shallow notch. This will cause the leaves to gape or yawn and entirely facilitate the insertion.

After insertion, the record is pushed home in the folder and a further backward pressure exerted by a thumb at the notches, pushes the folder home in the box or case.

We do not confine ourselves to the special form of the parts as shown that expose an area on one leaf by a cut-out notch less deep than that opposed to it in the other. This principle may be realized with a number of other forms.

For example, this end might be accomplished by making a difference in the height in place of the depth of the notches as in Fig. 8. Or the front edge of one leaf may be entirely cut away as in Fig. 10; or an additional ear or tab may be provided on one leaf, near the middle, and no corresponding one provided on the other, as in Fig. 11.

All of these schemes are simply differences of form. In each case some part of one leaf projects beyond the other, thus enabling a finger, by lateral pressure to cause them to gape or diverge.

Again we do not confine ourselves to the special form already described and depicted of the details that limit the extent to which a folder may be pulled out; other forms are operative. For example a lug may be provided, by so shaping the cardboard forming the folder that it may stop the outward pull by coming in contact with a surface on the top or bottom pieces of the box, as in Fig. 5, where the lug $S$ will stop further outward motion of the folder when it comes in contact with the vertical step $t$ of the top piece $e$.

In either of these schemes, or in others that we have conceived a cardboard that would be elsewhere abundantly strong and enduring must, unless its strength be reinforced, be bent and crushed by the repeated impacts of the moving part against the stationary part. This reinforcement we accomplish by the introduction of a flat member of about the thickness of a record between the leaves of a folder and there secure it by means of an adhesive, or by riveting, or both. This is shown in Figs. 5 and 6, $u$, $v$ and $w$. It is cut away inside so as not to interfere with the space provided for the record and the outside is shaped as is the folder, the edges being flush therewith.

It is also possible to use a thinner cardboard for the folder than otherwise would be practicable by further reinforcement, by pasting paper or other cardboard to the folder—first, on one or both sides of the symbol ears, Fig. 5; second, on one or both sides, covering and surrounding the exposed area used in yawning the leaves, as in Fig. 8; third on one or both sides of each leaf at any of the corners, excepting where already reinforced to strengthen the motion limiting device as in Figs. 5 and 6, where it is unnecessary. This is with the object of stiffening the leaves against pressure resulting from exerting a raising or lowering motion of the hand when drawing out the folder, see Figs. 6, 9, 10 and 11, $y$ and $z$. Some of these reinforcements would produce no increase in the width of the case and others only a little.

It will frequently be convenient to utilize a record holder for small records, that has been designed for large ones. In this case we make no change in our device beyond the introduction of a variety of flat fillers between the leaves of the folders at their extreme back and with their vertical centers about as far from the bottom piece as the center of the record. Said fillers are of about the thickness of a record and are secured in their places by proper adhesive or rivets, or both. The width of these fillers is about the difference in the diameters of the large record for which the holder is designed and the small record for which the holder is thus adapted.

Fig. 12 shows a folder equipped with such a filler, $a'$ $a'$ $a'$ $a'$, $b'$ $b'$ $b'$ $b'$ indicating the location of a small record and $c'$ $c'$ $c'$ $c'$ the location of a large record were the folder not equipped with the filler.

We consider novel and claim—

1. A disk-record holder, consisting of a containing box, folded record-receiving leaves sliding therein, each pair of leaves equipped with a symboled tab, and having a cut-out notch in both leaves for removing records, one notch being larger than the other for separating the leaves.

2. A disk-record holder consisting of a containing box, folded record-receiving leaves sliding therein, each equipped with symboled tabs on one leaf and a corresponding tab on the other leaf, and having a notch in both leaves for removal of records, one being larger than the other for separating the two leaves.

3. A disk-record holder consisting of a containing box and folded leaves sliding therein, the amount of sliding motion limited by a male or female projection coming in contact with a female or male member on the other, and a reinforcing member of about the thickness of a record properly secured between the leaves of the sliding record container and shaped to conform to its shape in the neighborhood of its contact part, substantially as described.

4. A disk-record holder consisting of a box, and folded record holders sliding therein and restrained to their direct outward motion by the inside surface of the top and bottom pieces of said box, some of the corners of said record holders being reinforced and stiffened by paper or cardboard attached to said corners by proper adhesive, substantially as described.

5. A disk-record holder consisting of a box and folded record containers sliding therein, said containers being adapted to be drawn out by means of ears or tabs on their forward edges, and pushed back by a backward thrust of the record, said record holder being designed for a large record, and a flat filler about the thickness of a record and secured between the leaves of the container, the back edge of which is in contact with the fold of the leaves of said container, the width of the said filler being about the difference between the diameters of the large record and small one, with the object as set forth of bringing the forward edge of the small record about as far forward as that of a large record would be were it inserted in a folder unprovided with said filler, all substantially as described and depicted.

6. A disk holder comprising a box, a record-container slidable back and forth within the box, comprising spaced leaves connected at one edge and disconnected at the front and top and bottom edges, whereby the record may be inserted and withdrawn from between said leaves, said leaves being foldable and openable at the edge where they are connected, one of said leaves at the front where they are disconnected having a portion projecting beyond the other leaf, and a tab, or projection to constitute a handle attached to said leaves.

7. A disk-record holder, consisting of a box, pairs of folded leaves slidable therein, the leaves of a pair being spaced to receive a record and connected at but one edge on which they are foldable and openable, and each pair of leaves equipped with a symboled tab, and notches for giving access to the records, the notch in one leaf being larger than that in the other, and means to limit the outward sliding movement of said pairs of leaves.

In testimony whereof we affix our signatures in presence of two witnesses.

MILES G. NIXON.
OBERLIN SMITH.

Witnesses:
 HUGH L. REEVES,
 PERCIVAL H. SMITH.